United States Patent

[11] 3,610,696

| [72] | Inventor | Garland L. Fulton<br>1428 Woodford Drive, Wayne, Pa. 19087 |
|---|---|---|
| [21] | Appl. No. | 824,651 |
| [22] | Filed | May 14, 1969 |
| [45] | Patented | Oct. 5, 1971 |
| | | Continuation-in-part of application Ser. No. 822,174, May 6, 1969, now abandoned. |

[54] FLUID-OPERATED CONVEYOR
12 Claims, 6 Drawing Figs.

[52] U.S. Cl. .................................................. 302/31, 302/29
[51] Int. Cl. ..................................................... B65g 53/04
[50] Field of Search .......................................... 302/17, 29, 31

[56] References Cited
UNITED STATES PATENTS

| 898,775 | 9/1908 | Norton | 302/29 |
| 1,759,983 | 5/1930 | Houston | 302/29 |
| 3,099,493 | 7/1963 | De Hart et al. | 302/29 |
| 3,180,688 | 4/1965 | Futer | 302/29 |

Primary Examiner—Andres H. Nielsen
Attorney—Zachary T. Wobensmith, II

ABSTRACT: A gaseous-fluid-operated conveyor is provided for advancing fluidizable material, and nonfluidizable material including packages, and for mixing fluent materials, with controlled temperatures if desired. The conveyor includes a channel with side guide walls and with a bottom wall or floor having two components, a deck plate of metal or plastic with spaced and staggered longitudinal slots supported by a direction-imparting supporting grill structure such as a metal honeycomb inclined from the horizontal. A wind box below the supporting structure has gaseous fluid such as air, heated or cooled as desired, supplied thereto to supply the impelling force for the materials to be conveyed.

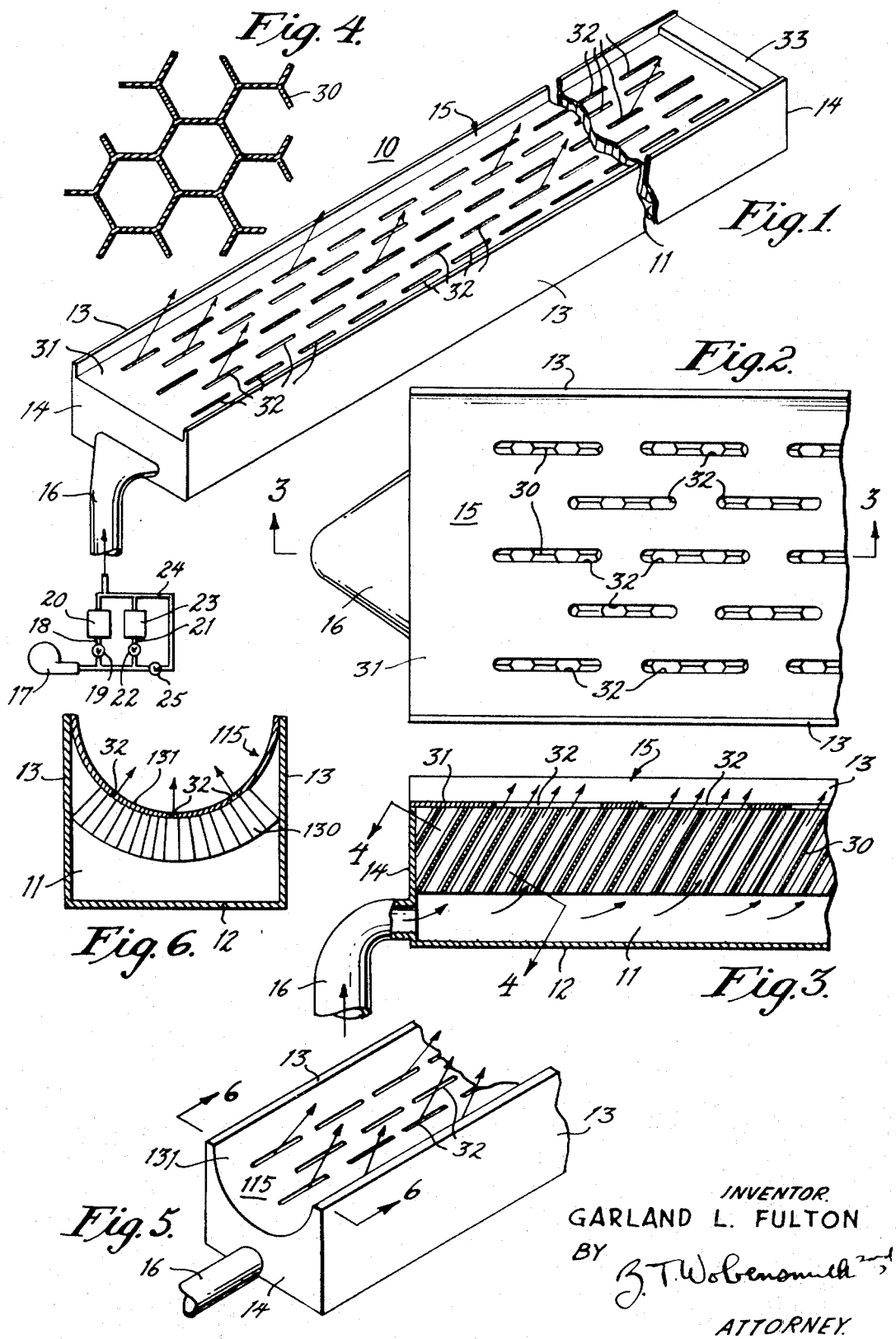

3,610,696

FLUID-OPERATED CONVEYOR

CROSS-REFERENCE TO RELATED APPLICATION

This application is a continuation-in-part of my prior application Ser. No. 822,174 filed May 6, 1969, now abandoned.

BACKGROUND OF THE INVENTION

1. Field of the Invention

This invention relates to conveyors and more particularly to conveyors in which a gaseous fluid is supplied through a deck to advance articles to be conveyed.

2. Description of the Prior Art

It has heretofore been proposed by Dodge in U.S. Pat. No. 557,059 to convey materials by suction through a closed tube, with narrow slots formed at an angle in the bottom. The employment of suction and of a closed tubular conduit limits the power input available and also usefulness of the device for moving many articles and materials.

It has also been proposed by Futer, in U.S. Pat. Nos. 3,131,974, 3,180,688 and 3,304,619, and by Epstein, in U.S. Pat. No. 3,181,916, to convey materials using air along a trough having a bottom wall or floor of sheet material with transverse slots formed therein, by deformation of the sheet material, to guide the air. Futer, in U.S. Pat. No. 3,180,688, shows additional openings through the sheet material either upright or inclined.

The fabrication of the decks as shown in these Futer and Epstein patents is very costly and the transverse arrangement of the slots has disadvantages in attempting to start up a plurality of articles which have come to rest for any reason on the supporting deck. The Futer slot construction can be easily damaged in use resulting in changes in the direction and force applied by the airstreams.

It has also been proposed by Williams, in U.S. Pat. No. 3,429,544, and others to provide a table to project a plurality of spaced round jets of air upwardly for lifting but without any horizontal advancing movement of the articles on the table.

SUMMARY OF THE INVENTION

In accordance with the invention a gaseous fluid conveyor is provided employing a channel with a bottom wall or floor through which the fluid for effecting the conveying action is directed, by having an inclination or horizontal component imparted thereto by a lower supporting component and by having the fluid discharged through a superposed cover of sheet material which has slots elongated in the direction of intended propulsion and in transversely spaced and staggered relation.

In accordance with the invention also, the lower and supporting component of the floor can advantageously be of metallic honeycomb, and the upper component of the floor can be of sheet metal or sheet plastic slotted by cut saws, punches or the like.

In accordance with the invention, also, the gaseous fluid can be heated or cooled as desired.

In accordance with the invention also, a removable dam or barrier may be employed where delayed advance of part of the material is desired.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a view in perspective of a conveyor unit in accordance with the invention, parts being shown diagrammatically;

FIG. 2 is a fragmentary top plan view of a portion of the unit shown in FIG. 1;

FIG. 3 is a vertical sectional view taken approximately on the line 3—3 of FIG. 2;

FIG. 4 is a fragmentary sectional view, enlarged taken approximately on the line 4—4 of FIG. 3;

FIG. 5 is a view in perspective of a modified form of the invention; and

FIG. 6 is a sectional view taken approximately on the line 6—6 of FIG. 5.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to FIGS. 1 to 4 of the drawings, a conveyor unit 10 there shown comprises a wind box 11 having a bottom wall 12, sidewalls 13, end walls 14 and a deck or floor 15 above which the sidewalls 13 extend on each side.

The wind box 11 has connected thereto a gaseous fluid supply pipe 16. The pipe 16 is connected to any suitable source of gaseous fluid, such as air, under pressure such as a blower 17. The blower 17 can be selectively connected to the pipe 16 by a pipe 18 controlled by a valve 19, through a heater 20, or by a pipe 21 controlled by a valve 22, through a cooler 23 or directly through a pipe 24 controlled by a valve 25.

The deck 15 in accordance with the invention and in a specific embodiment is 6 feet long and 6 inches wide.

The deck 15 preferably consists of a lower component 30 to provide a support and plenum and advantageously is of a honeycomb construction, expanded or corrugated, of aluminum, stainless steel, or the like or of heat-resistant plastic reinforced with glass fibers, or even of kraft paper for some uses. The support 30 is inclined to give the desired direction to the gaseous fluid to provide a suitable horizontal force component and an angle of the order of 10° from the horizontal has been found satisfactory for some purposes.

The upper margins of the honeycomb support 30 have carried thereon, and preferably secured thereto by a suitable adhesive, a cover sheet 31.

The cover sheet 31 can be of metal or of synthetic plastic, such as nylon and is provided with a plurality of slots 32, elongated in the direction of the longitudinal axis of the conveyor unit 10. The number, location and dimensions of the slots 32 will be varied to suit different operating requirements but in a specific embodiment slots 32 2½ inches long and ninety thousandths of an inch in width with ½-inch spacing transversely and longitudinally, and staggered, have been found suitable. An open area of slots 32 of the order of 5 to 20 percent of the total area of the deck 15 gives satisfactory results. A thickness of cover sheet 31 of the order of one-sixteenth of an inch has been found suitable for some purposes, the support being provided principally by the support 30.

The quantity of gaseous fluid supplied to the wind box 11 will be determined by the specific demands on the unit but for the particular embodiment previously referred to in detail, and with a deck 15 of a width of about 6 inches and a length of about 6 feet, about 700 cubic feet per minute at an average static pressure in the wind box 11 of about 1 to 1½ inches of water has produced satisfactory results.

For some purposes it has been found desirable to provide one or more dams or abutments 33, movable or removable as desired on the deck 15 to cause a delaying action on the movement of materials, and particularly fluent granular or particulate materials, to improve the fluidizing of the bed, or to increase the processing time, resulting in shorter length of conveying required for processing.

The mode of operation will now be pointed out.

Fluid supplied by the blower 17 or other source, is directed to the pipe 16 with heating by the heater 20, cooling by the cooler 23, or directly without temperature change through the pipe 24, and into the wind box 11. The gaseous fluid in the wind box 11 exits through the slots 32 in the cover sheet 31 with vertical and horizontal components of force imparted thereto, determined by the inclination of the support 30, and with an advancing horizontal component longitudinally axially of the deck 15.

The action which occurs on the deck 15 will vary with the material to be handled.

For granular and particulate materials the vertical force component of the gaseous streams exiting through the slots 32 has a vertical lifting and agitating effect and with one or more transverse dams 33 in place a holdback or backup of the materials which occurs enhances the agitation so that a plurality of materials can be mixed during the advance. The horizontal force component in the streams from the slots 32 aids in the advance along the deck 15.

For objects such as boxes to be moved along the deck, the knife edge type of fluid streams exiting from the slots 32 permits of accumulating a plurality of objects which substantially cover the entire surface of the deck 15 and which will then be moved in a group when permitted to do so, such as by removal of the abutment, dam 33 or the like, which was used to effect the accumulation.

Cooling of the material can be effected, if desired, to bring the temperature to a level for packaging or for other purposes or heating for changing the characteristics of the materials being conveyed is also available.

Referring now to FIGS. 5 and 6, in the form of the invention there shown, the deck 115 is arcuate transversely between the sidewalls 13. The support 130 and cover sheet 131 are similar to the support 30 and cover sheet 31 except for the transverse curvature between the side margins.

While the decks 15 and 115 are shown as horizontal they may be inclined upwardly or downwardly, the force input being varied as desired for this purpose.

I claim:

1. A fluid-actuated conveyor comprising
a connection to a source of gaseous fluid under pressure,
a conveyor unit having a wind box with which said connection is in communication,
said conveyor unit above said wind box having an elongated deck for movement of material therealong,
said deck having a lower supporting portion having a plurality of passageways imparting with respect to said deck downstream and impelling and normal and supporting components to gaseous fluid discharged from said wind box, and
an upper relatively rigid cover sheet mounted on said supporting portion in blocking relation to certain of said passageways and having a plurality of openings communicating with others of said passageways for discharge of gaseous fluid directed therethrough by said supporting portion and for impelling material by said downstream component.

2. A fluid-actuated conveyor as defined in claim 1 in which said upper cover sheet has said openings elongated along said deck.

3. A fluid-actuated conveyor as defined in claim 2 in which said openings are in staggered relation.

4. A fluid-actuated conveyor as defined in claim 2 in which said openings are in transversely spaced and staggered relation.

5. A fluid-actuated conveyor as defined in claim 1 in which said upper cover sheet has the openings therein in the form of slots.

6. A fluid-actuated conveyor as defined in claim 1 in which said lower supporting portion is of honeycomb construction.

7. A fluid-actuated conveyor as defined in claim 2 in which said deck is flat.

8. A fluid-actuated conveyor as defined in claim 2 in which said deck is transversely concave between its opposite side margins.

9. A fluid-actuated conveyor as defined in claim 1 in which additional means is provided for changing the temperature of the gaseous fluid prior to its passage through said deck.

10. A fluid-actuated conveyor as defined in claim 1 in which said upper cover sheet is of synthetic plastic sheet material.

11. In a fluid-actuated conveyor
a conveyor unit having a fluid pressure chamber,
means for supplying fluid under pressure to said chamber,
said conveyor unit having a deck with a face along which articles are movable, and
means for supplying fluid from said chamber for impelling articles along said deck face,
said last-mentioned means including members having portions providing longitudinally elongated fluid-jet-forming passages extending toward said face and said deck face having portions providing longitudinally elongated discharge openings of a length substantially greater than its widths disposed lengthwise of said deck face and with which said jet-forming passages are in communication for delivery of fluid through said discharge openings.

12. A fluid-actuated conveyor comprising
a conveyor unit having a fluid pressure chamber,
means for supplying fluid under pressure to said chamber,
said conveyor unit having a deck with a face along which articles are movable, and
means for supplying fluid from said chamber for impelling articles along said deck face,
said last-mentioned means including portions having openings at said deck face of a length corresponding to a multiplicity of times the width of said opening and disposed lengthwise of said deck face.